United States Patent [19]

Matsumoto et al.

[11] Patent Number: 4,910,366

[45] **Date of Patent: * Mar. 20, 1990**

[54] ENGINE IDLE POSITION DETECTING SWITCH

[75] Inventors: Osamu Matsumoto; Teruhiko Moriguchi; Yutaka Okaue, all of Himeji, Japan

[73] Assignee: Mitsubishi Denki Kabushiki Kaisha, Tokyo, Japan

[ * ] Notice: The portion of the term of this patent subsequent to Mar. 28, 2006 has been disclaimed.

[21] Appl. No.: 219,366

[22] Filed: Jul. 15, 1988

[30] Foreign Application Priority Data

Jul. 21, 1987 [JP] Japan .......................... 62-112397[U]

[51] Int. Cl.4 ........................ G01M 15/00; H01H 3/16

[52] U.S. Cl. ................................ 200/61.89; 73/118.1; 200/276.1; 200/61.76

[58] Field of Search ...................... 73/118.1; 200/16 B, 200/16 C, 61.76–61.79, 159 R, 276, 61.85–61.91, 276.1

[56] References Cited

U.S. PATENT DOCUMENTS

| | | | |
|---|---|---|---|
| 3,792,219 | 2/1974 | Rowley | 200/276 X |
| 3,919,509 | 11/1975 | Schnitzius | 200/276 X |
| 4,118,976 | 10/1978 | Mitsuda et al. | 73/118.1 |
| 4,564,730 | 1/1986 | Tomizu et al. | 200/61.76 X |
| 4,681,994 | 7/1987 | Nagata et al. | 200/61.76 X |
| 4,815,317 | 3/1989 | Matsumoto et al. | 73/118.1 |

FOREIGN PATENT DOCUMENTS

| | | |
|---|---|---|
| 61-82047 | 5/1986 | Japan . |
| 61-82048 | 5/1986 | Japan . |

*Primary Examiner*—J. R. Scott
*Attorney, Agent, or Firm*—Oblon, Spivak, McClelland, Maier & Neustadt

[57] ABSTRACT

An idle position detecting switch includes a metal housing supported on a throttle body and being electrically connected to the throttle body. the housing contains a push rod which is axially slidable therein, one end of which forms a moveable contact in the housing. A fixed contact is fixed in the housing via a resinous insulator which is connected to a resinous guide for supporting and guiding the push rod. A metal spring in the housing biases the push rod such that the movable contact is spaced from the fixed contact and has opposite ends respectively connected to the movable contact and the housing. As a result, the guide and insulator can independently be incorporated with each other even before a connector is fixed to the housing.

2 Claims, 4 Drawing Sheets

ENGINE IDLE POSITION DETECTING SWITCH

BACKGROUND OF THE INVENTION

1. Field of the Invention

The present invention relates to a switch for detecting an idle position of an internal combustion engine.

2. Discussion of Background

An idle position detecting switch is used in an internal combustion engine in case that a control is required, for example, as to a fuel supply amount in accordance with a degree of opening of a throttle valve.

An example of such conventional idle position detecting switches is shown in FIG. 5. In FIG. 5, internally arranged in a cylindrical housing fixed to a throttle body 1 are a push rod 3, a movable contact 4 disposed at the lower end portion of the push rod 3, and a fixed contact 5 opposing the movable contact 4. The throttle body 1 is fixed to the engine (not shown) and thus grounded therethrough. The push rod 3 ia slidably fitted inside a small diameter portion 6*a* of a cylindrical guide 6 set in the housing 2. The upper end portion of the push rod projects from an opening at the upper end of the housing 2. A ring plate 7 fits around the lower end portion of the push rod 3 inside a large diameter portion 6*b* of the guide 6. A cylindrical insulator 8 is disposed inside the lower opening portion of the housing 2. A large diameter portion 8*a* of the insulator 8 fits in an inner circumference of the housing 2. A small diameter portion 8*b* of the insulator 8 fits around the lower end portion of the push rod 3. A lead plate 7*a* is interposed between the lower end face of the large diameter portion 6*b* of the guide 6 and an end face of the large diameter portion 8*a* of the insulator 8. A spring 9 is interposed as an electric member between the plate 7 and the lead plate 7*a*. Consequently, the push rod 3 is always urged by the spring 9 toward a pivoting end portion 20*a* of a stopper 20 linked to a valve shaft 19 of the throttle valve. The push rod 3 is slidable against the elastic force of the spring 9 by being pushed by the stopper 20. A terminal 14 is connected to the fixed contact 5 and guided to the outside through a resinous connector 11 set inside the lower end opening of the housing 2. The connector 11 is fixedly held in the housing 2 by caulking a portion 2*b* which extends from the lower end opening of the housing 2. The housing 2 has a threaded portion 2*a* on the upper periphery of the housing 2. The threaded portion 2*a* meshes with a female screw 1*a* threaded in the throttle body 1. A numeral 17 represents a rubber seal mounted over the upper end periphery of the housing 2.

There will be described an operation of the above-described switch.

When the valve shaft 19 of the throttle valve rotates in response to full closing of the throttle valve, the push rod 3 is pushed against the elastic force of the spring 9 by the pivoting end portion 20*a* of the stopper 20. As a result, the movable contact 4 provided at the lower end of the push rod 3 comes in contact with the fixed contact 5. The stopper 20 is positioned at this stage. The electric current from the terminal 14 is transmitted through the fixed contact 5, the push rod 3, the plate 7, the spring 9, the lead plate 7*a*, the housing 2 and the throttle body 1 to the earth, enabling the detection of the idle position.

In such conventional idle position detecting switch, the spring 9 for electric communication between the plate 7 and the lead plate 7*a* simply touches the plates 7, 7*a* at both ends thereof. The simple pressing arrangement of the spring 9 causes contact resistance. The contact resistance results in insufficient output of the detection signal. This tendency may be aggravated by oil adhesion onto and/or oxidation of the contacting surfaces. Further, if the spring 9 rotates in between the plates 7, 7*a* to change its contacting surfaces, the detection signal differs depending on contact position due to the same reason, causing instability of detection in the conventional switch.

Inventors of the present invention have invented such arrangement that the both ends of the spring 9 are fixed to respectively corresponding members, and filed a Japanese Utility Model Application No. 203257/1986, on Dec. 26, 1986. The inventors also filed U.S. patent application Ser. No. 137,580, filed Dec. 24, 1987 now Patent No. 4,815,317 claiming the priority based on the aforementioned Japanese application. assigned to the U.S. patent application, now copending with the present application.

As discussed in U.S. Pat. No. 4,815,317, since the both ends of the spring are fixed, the contact resistance thereat may be reduced, providing a stable signal. The arrangement is detailed below in reference to FIG. 4. Explanation will be simplified by showing the same elements with the same symbols as the arrangement in FIG. 5. The above description as to the same elements is incorporated herewith. A numeral 12 denotes a fixing ring disposed at the lower end of the push rod 3, numeral 13 a support disk carrying the fixed contact 5, a numeral 14 a terminal piece electrically connecting to the fixed contact 5 supported by the support disk 13, and a numeral 15 an end of a lead wire caulked with the terminal piece 14. A symbol 2*c* represents a step portion formed in the lower opening of the housing 2.

The upper end of the spring 9 has a small winding portion 9*a* extending radially inward and fitting around the small diameter portion at the lower end of the push rod 3. When the fixing ring 12 is secured to the lower end of the push rod 3, the small winding portion 9*a* is held between the ring 12 and the plate 7. Thus, the upper end of the spring 9 is electrically connected securely to the movable contact 4. The lower end portion of the spring 9 has a large winding portion 9*b* extending radially outward. The large winding portion 9*b* is located in a guide groove 8*e* arranged about the periphery of the insulator 8, and pinched by the insulator 8 and the step portion 2*c* of the housing 2 therebetween. In this way, the lower end of the spring 9 is electrically connected firmly to the housing 2. The pinching of the both ends of the spring 9 is simultaneously effected when the connector 11 is fixedly held by the housing 2 by caulking the portion 2*b* thereof.

A radially outwardly extending part of the lower end portion of the spring 9 passes through a recessed portion 8*d* to connect to the large winding portion 9*b* outside the recessed portion 8*d*. The insulator 8 has the guide groove 8*e* about its periphery as described before. The insulator 8 further has a post 8*c* opposite to the recessed portion 8*d* with respect to the center. The large diameter portion 6*b* of the guide 6 faces the insulator 8, so that the guide 6 and insulator 8 substantially enclose the spring 9 and the movable contact 4. The large diameter portion 6*b* has a cut 6*c* for receiving the post 8*c* of the insulator 8. The cut 6*c* is further engaged with a projection 7*b* radially extending from the plate 7, to be movable in the axial direction.

A wave washer 16 is disposed between the housing 2 and the large diameter portion 6b of the guide 6. A numeral 18 denotes a rubber cover surrounding the connector 11.

According to the above-described arrangement disclosed in U.S. Pat. No. 4,815,317, the plate 7 electrically connected to the movable contact 4 may be kept in secure electric communication with the housing 2, that is, in a state to be grounded through the spring 9.

However, the arrangement as shown in FIG. 4 has drawbacks as described below. In the arrangement, inserted in the housing 2 are the guide 6, the push rod 3 with the spring 9, and the insulator 8 in a consecutive order. The fixed contact 5 is placed on the connector 11. After that, the housing 2 and the connector 11 are assembled together and incorporated with each other by the caulking of the portion 2b of the housing 2. It is difficult to confirm that the part of the spring 9 radially outwardly extending to the large winding portion 9b just passes through the recessed portion 8d formed on the insulator upon the assembling of the housing 2 and the connector 11 with the insulator 8 interposed therebetween. There is discovered such a problem that the radially outwardly extending part of the spring 9 does not always pass through the recessed portion 8d of the insulator 8 and is often nipped by plain ends of the guide 6 and the insulator 8. Such nipping contact easily be found upon the assembling. Also, the assembling requires much time, resulting in lowering of productivity.

SUMMARY OF THE INVENTION

The present invention has provided a solution to the above-mentioned problems in such switches.

It is an object of the present invention to provide an idle position detecting switch capable of generating a secure and stable output upon idle position detection and being radially assembled without nipping or biting between plain ends of insulator or guide.

An idle position detecting switch comprising a metal housing supported on a throttle body and electrically connected to the body; a push rod mounted in the housing so as to be axially slidable, one end of the rod projecting from the housing to face a stopper provided on the valve shaft of a throttle valve; a movable contact arranged at the other inner end of the push rod; a fixed contact fixed to the housing in an insulated state to oppose the movable contact; a resinous guide for supporting and guiding the push rod; a resinous insulator serving for fixing the fixed contact in an insulated manner; and a metal spring biasing the push rod to return the rod to an initial position, the spring functioning to electrically connect the movable contact to the housing therethrough to the earth, one end of the metal spring being secured at the movable contact side and the other end thereof at the housing side; wherein an idle position signal is generated when the both contacts come in contact with each other by the stopper of the throttle valve pushing the push rod; and wherein the guide and insulator are so structured as to be incorporated with each other.

According to the present invention, when the guide, a push rod with a spring and the insulator are inserted in the housing in a consecutive order, these elements are inserted as an incorporated unit. Moreover, upon the incorporating of these parts, the spring can be positioned such that a part of the spring radially outwardly extending toward a large winding portion thereof just fits in a recessed portion forward on the insulator.

DESCRIPTION OF THE PREFERRED EMBODIMENTS

Figure 1:
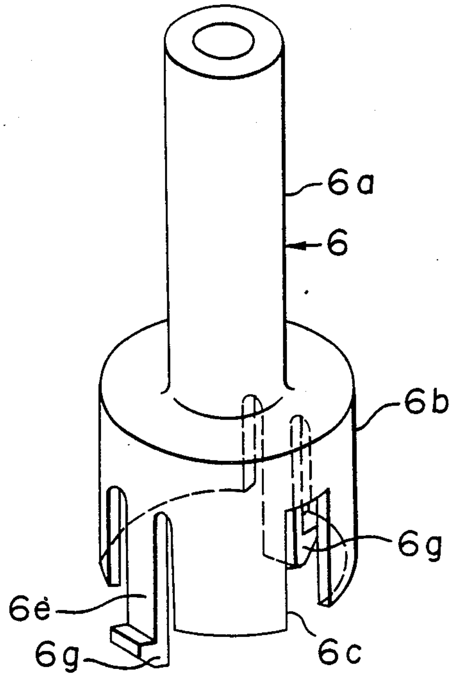
FIG. 1 is an oblique view of a guide according to the present invention.
Figure 2:
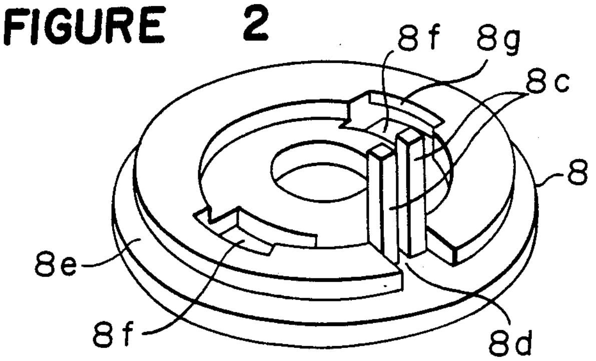
FIG. 2 is an oblique view of an insulator corresponding to the guide according to the present invention.
Figure 3:
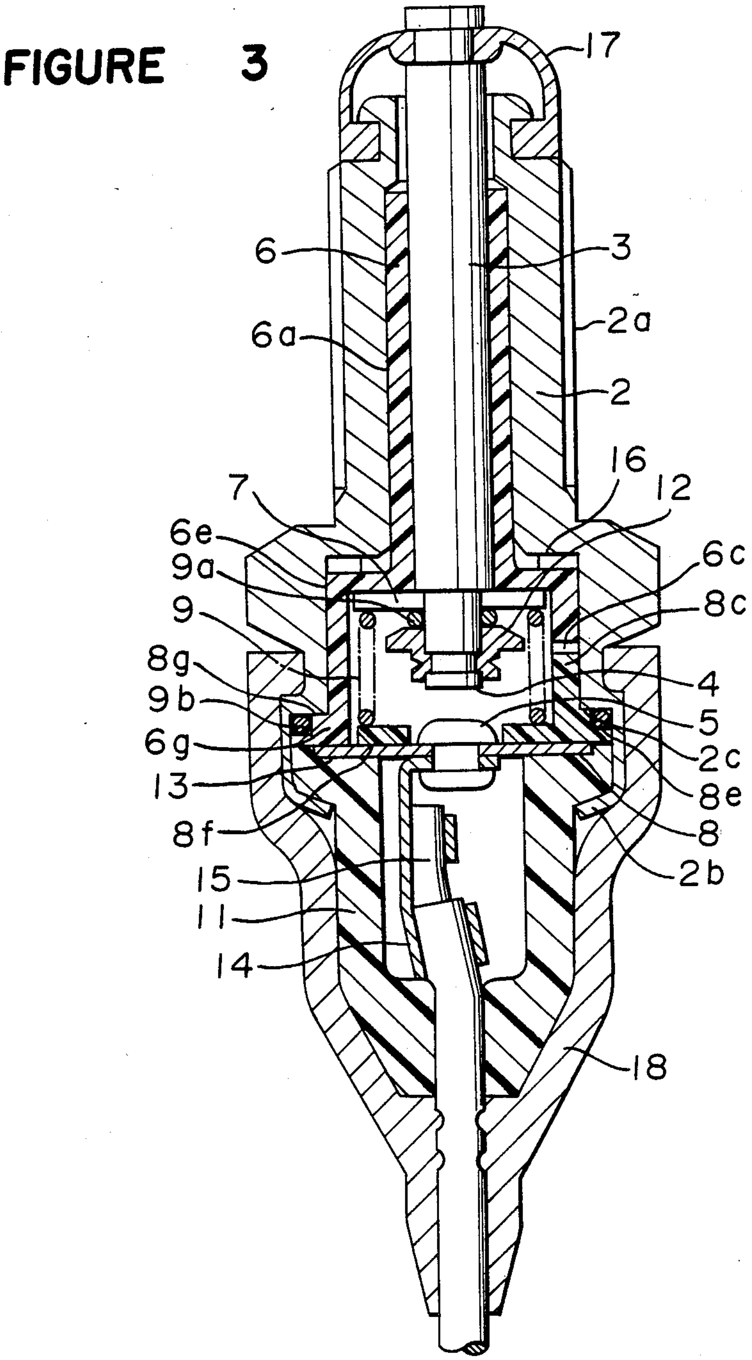
FIG. 3 is a cross-sectional view of an idle position detecting switch having the guide and the insulator.
Figure 4:
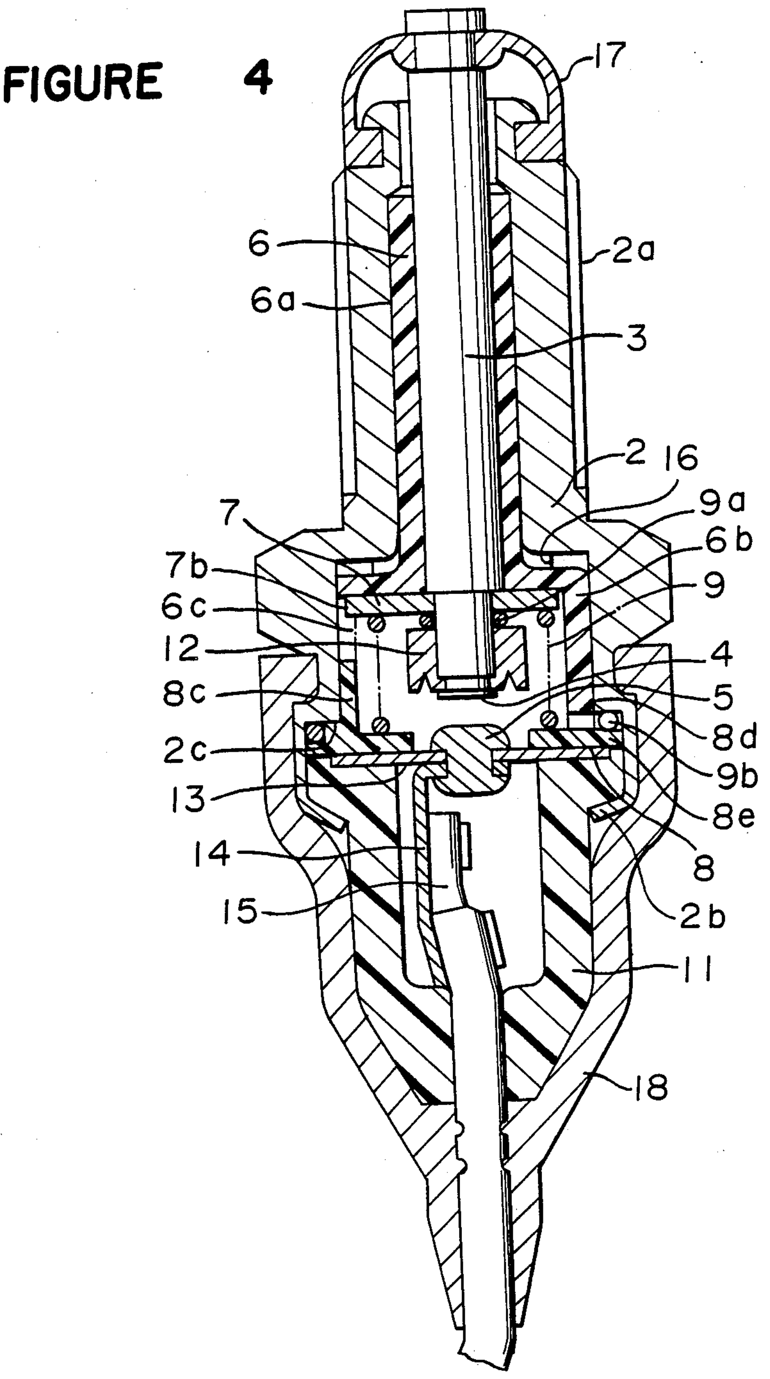
FIG. 4 is a cross-sectional view of another idle position detecting switch which has been invented by the same inventors as the present invention.
Figure 5:
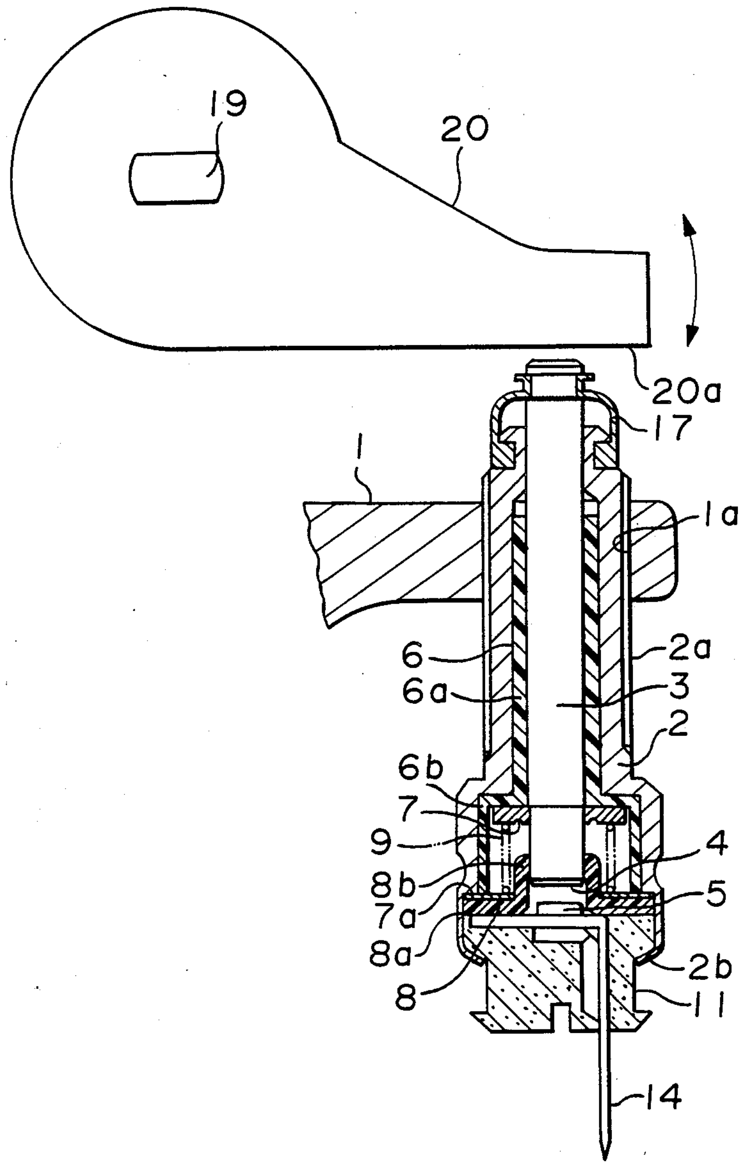
FIGURE 5 PRIOR ART
FIG. 5 is a cross-sectional view of a conventional idle position detecting switch.

An embodiment of the present invention is explained below in reference to FIGS. 1 to 3. FIG. 1 is an enlarged oblique view of a guide 6 according to the present invention, FIG. 2 is an enlarged oblique view of an insulator 8 corresponding to the guide, and FIG. 3 is a cross-sectional view of an idle position detecting switch having the guide 6 and the insulator 8. In these drawings, the same elements as the afore-mentioned switches are designated by the same numerals. Therefore, the above description for the same elements in the related background art is incorporated herewith in order to avoid repetition. A numeral 6e denotes elastic legs integral with the large diameter portion 6b of the guide 6, and numeral 6g denotes snap fitting pawls arranged at the respective lower ends of the elastic legs 6e. A numeral 8f represents snap fitting holes on the insulator 8 for receiving the snap fitting pawls, and symbol 8g denotes engagement portions for being engaged with the snap fitting pawls 6g to secure the fitting therebetween.

The assembling operation of the switch is explained below.

The push rod 3 to which the spring 9 is fixed is inserted in the guide 6. The radially outwardly extending part of the spring 9 toward the large winding portion 9b is matched with the cut 6c upon insertion. Then, the insulator 8 is brought to the lower end of the large diameter portion 6b of the guide such that the posts 8c fit in the cut 6c and that the radially outwardly extending spring part passes through the clearance 8d between the posts 8c. The snap fitting pawls 6g of the guide 6 snap at the engagement portions 8g of the insulator 8 to complete the incorporation of the guide 6 and the insulator 8, with the guide 6 containing the push rod 3 therein while the upper end of the push rod projects therefrom. This arrangement makes it easy for the guide 6, the push rod 3 with the spring 9 and the insulator 8 to be inserted in the housing 2. Further, it can be readily assured that the radially outwardly extending spring part toward the large winding portion 9b fits in the clearance 8d on the insulator 8. Accordingly, caulking can swiftly be carried out at the caulking portion 2b.

FIGS. 1 and 2 show only one example of a snap fitting arrangement between the guide 6 and the insulator 8. Modifications and alteration of the arrangement are within the scope of the present invention.

As explained above, the present invention allows the prevention of spring nipping between the end face of the guide large diameter portion and the plain end of the insulator, enabling the accurate and rapid assembling of the switch. Therefore, the productivity of switch can be improved remarkably and the reliability of function of idle position detector can also be increased.

Obviously, numerous modifications and variations of the present invention are possible in light of the above teachings. It is therefore to be understood that within the scope of the appended claims, the invention may be practiced otherwise than as specifically described herein.

What is claimed is:

1. An idle position detecting switch comprising:

a metal housing supported on a throttle body and electrically connected to the body;

a push rod mounted in the housing so as to be axially slidable, one end of said rod projecting from the housing to face a stopper provided on the valve shaft of a throttle valve;

a movable contact formed at an other end of the push rod in the housing;

a resinous insulator in said housing;

a fixed contact fixed to said housing in opposition to the movable contact by said resinous insulator, whereby said fixed contact is insulated from said housing;

a resinous guide in said housing for supporting and guiding said push rod, said resinous guide and said resinous insulator including means for connecting said resinous guide and said resinous insulator with one another; and a metal spring biasing said push rod such that said movable contact is spaced from said fixed contact, said spring comprising means for electrically grounding said movable contact to said housing, one end of said metal spring being secured to the movable contact and the other end thereof being secured to the housing;

wherein an idle position signal is generated when both contacts come in contact with each other by a stopper of the throttle valve pushing the push rod.

2. An idle position detecting switch according to claim 1, wherein said means for connecting said guide and said insulator comprise an element formed integrally with one of said guide and said insulator and snap fitting with the other of said guide and said insulator.

* * * * *